Dec. 1, 1942.   W. E. AMBERG ET AL   2,303,420
PASTRY CONE PROVIDED WITH SANITARY SHIELD
Filed Oct. 22, 1938
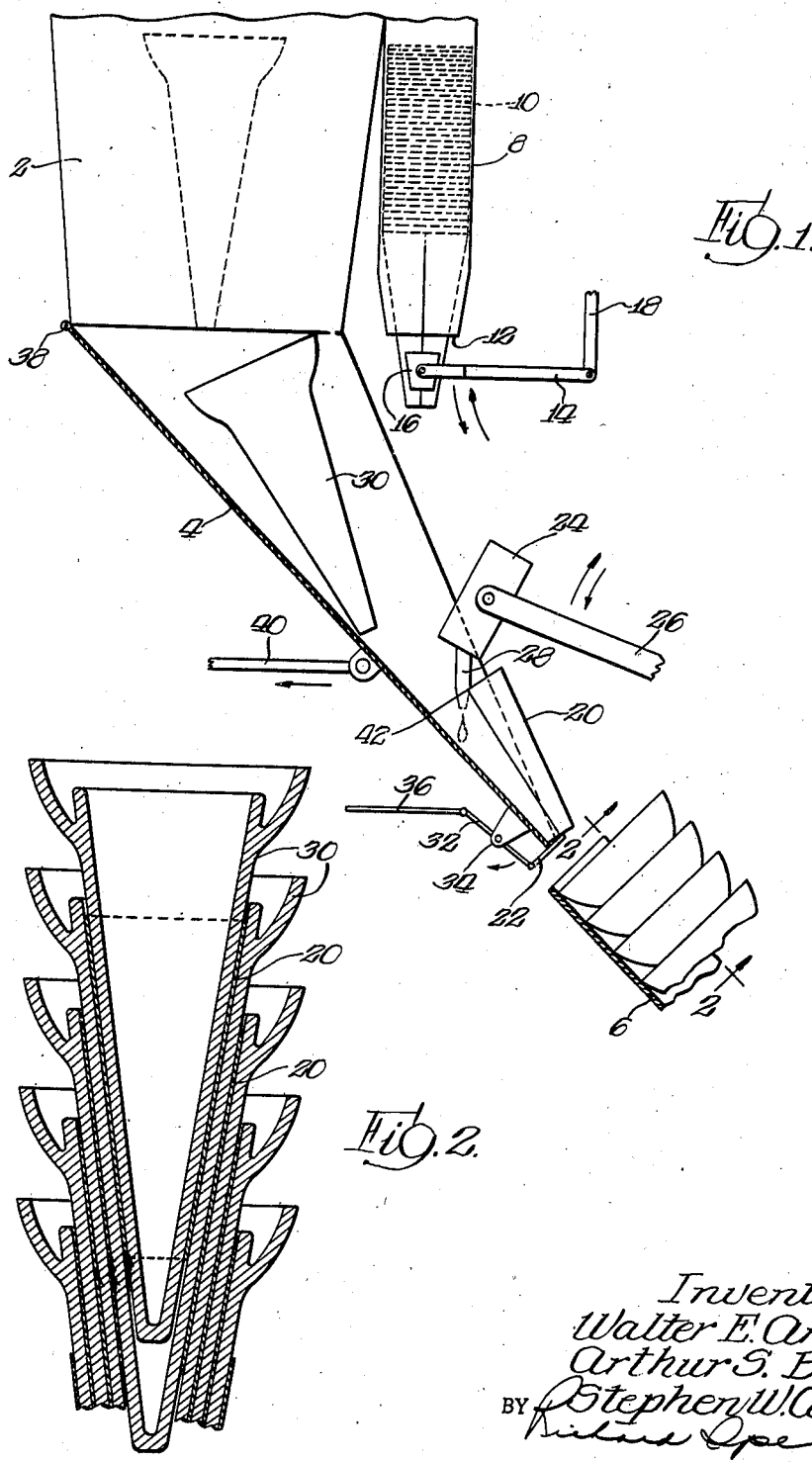
Inventors:
Walter E. Amberg,
Arthur S. Bowes,
BY Stephen W. Amberg,
ATTORNEY.

Patented Dec. 1, 1942

2,303,420

UNITED STATES PATENT OFFICE 2,303,420

PASTRY CONE PROVIDED WITH SANITARY SHIELD

Walter E. Amberg, Arthur S. Bowes, and Stephen W. Amberg, Chicago, Ill., assignors to Universal Paper Products Company, Chicago, Ill., a corporation of Illinois Application October 22, 1938, Serial No. 236,585

6 Claims. (Cl. 93—2)

This invention relates to pastry cones provided with sanitary shields and to a new and improved method and apparatus for applying sanitary shields to pastry cones, such as ice cream cones.

One of the objects of this invention is to provide a method and means for preventing dirty hands from coming in contact with pastry cones or wafers during the packing of such cones or when they are about to be used in the dispensing of ice cream.

As is well known, pastry cones are subjected to handling from numerous sources, for example, in packing them into containers as they come from the baking machines, in unpacking them at soda fountains and the like to store them in other containers or disepnsers from which they are taken one by one to be used in dispensing ice cream, in filling such cones with ice cream by the soda fountain clerk, and finally by the user while eating the ice cream. Since these cones are edible and are customarily eaten with the ice cream, this handling is a constant source of contamination.

According to the present invention a method and means are provided for applying a sanitary shield to each cone individually after it comes from the baking molds and before it is stacked in nested relationship with other cones. In accordance with this invention, furthermore, pastry cones are provided with shields in such direct engagement therewith that said cones may be stacked in nested relationship and each of said cones with its surrounding shield may be removed from said stack without causing the shield to be removed from its cone, but at the same time each shield may be removed from its respective cone by a hand pull without destroying the cone.

Other objects and advantages of the invention will appear from the following description thereof, particularly with reference to the accompanying drawing, in which:

Figure 1 illustrates a form of apparatus representing a preferred embodiment of this invention;

Figure 2 illustrates pastry cones stacked in nested relationship with sanitary cone shields applied thereto.

Referring to Figure 1, the apparatus illustrated comprises a passageway 2 leading to a chute 4 which in turn leads to a stacking chute 6. Adjacent passageway 2 is a dispenser 8 containing a number of paper shields in nested relationship. These shields may be prepared in any suitable manner from paper or other suitable material, preferably of such character that the shields will retain a frusto-conical form. This frusto-conical form may be varied to suit the size and shape of the particular pastry cone which it is to cover. It is of outstanding importance for our purpose that the shield fit the pastry cone in such a manner as to permit stacking of the cones and their respective surrounding shields in nested relationship one within the other.

We preferably employ a cone shield of frusto-conical shape which is sufficient to cover an area around the central portions of the cone, leaving the top margins, as well as the apex of the pastry cone, exposed. The top margins are preferably left exposed in order that the shield does not interfere with filling the cone with ice cream. At the same time, by leaving the marginal portions exposed at the top of the cone it is possible for the consumer to hold the cone by the shield while eating a portion of said cone. A shield is not required around the apex of the cone because this portion receives very little handling. Leaving the apex portion of the cone unshielded also permits the consumer to withdraw the edible contents of the cone through said portion, if so desired.

The nested shields 10 carried in dispenser 8 are removed in any suitable manner through dispenser opening 12, as, for example, by means of a mechanically operated arm 14 adapted to move back and forth in the directions of the arrows and having a friction member 16 made of a rubber or other resilient material adapted to grasp the bottom-most cone shield and pull it through the dispenser opening.

After each shield has been pulled through dispenser opening 12, it is released by friction member 14 which is returned toward dispenser opening 12 for engagement with the next cone shield. Member 14 is operated through an arm 18 connected to any suitable mechanical means for effecting the desired back and forth movement.

As each cone shield is removed from dispenser 8 through dispenser opening 12, it drops toward chute 4 and comes to rest in the position illustrated by shield 20 where it is momentarily held by stop 22. As soon as cone shield 20 comes to rest, or slightly before, means are provided through a dispenser 24 connected to an arm 26 for introducing a drop of sirup or other adhesive material from a spout 28 to the interior of shield 20. Sirup dispenser 24 then moves out of the way, being operated mechanically in any suitable manner, as will be readily understood by those skilled in the art so that immediately thereafter a pastry cone 30 may pass into shield 20.

As soon as pastry cone 30 starts to pass into shield 20, stop 22, which is connected by a rod 32 mounted on a fulcrum 34 to an actuating member 36, is caused to move out of the path of cone shield 20, thus permitting cone 30 to engage cone shield 20. At the same time, or shortly thereafter, chute 4, which is hinged by hinge member 38 to the wall of passageway 2, is caused to move or vibrate slightly by an actuating member 40 connected to any suitable actuating means. This movement, together with the force of gravity, causes the cone and the cone shield in engagement with each other to pass into delivery chute 6.

In a similar manner cone shields are applied successively to the pastry cones as they come from the pastry cone machine ready for delivery in nested relationship.

It will be understood that the dropping of the cone shields from dispenser 8, the application of sirup or other adhesive medium to the interior thereof, the removal of stop 22 and the movement of chute 4 are all synchronized with the dropping of cone 30 and this may be accomplished in any suitable manner and by any suitable actuating mechanism such as may be readily constructed by those skilled in the art. Other types of mechanisms may be employed for causing the cone shields to be dispensed from dispenser 8. Other means may also be used for obtaining engagement between the shield and the cone. Likewise, other means may be employed for causing the cone shild with the engaged cone to be stacked in nested relationship in a delivery chute. For example, instead of a moving or vibrating chute 4, we may provide a pusher member such as described in Bruckman, United States Patent 1,271,844. In some instances the use of stop 22 is unnecessary. In order to facilitate passage of cone 30 into shield 20, a recess may be provided in chute 4 at point 42.

Instead of using the type of mechanism illustrated in the drawing, another type of mechanism may be employed in which the cone shields are dispensed with the larger end of the shield closest to the chute or runway 4. In such a mechanism means may be provided for grabbing the larger end of the shield, pulling the shield from the dispenser, swinging it into place over chute or runway 4 and dropping it with the small end downward in position for engagement with a pastry cone. Many other variations may be made in the mechanism described without departing from the invention.

In making pastry cones it is customary to first bake the cones in a suitable mold, then trim the tops of the cones and finally stack the cones in nested relationship. Our mechanism for applying a shield to the cones is preferably interposed between the trimming mechanism and the stacking mechanism as herein described. We have found that there are advantages in applying the shields to the cones while the cones are still hot, particularly because as the cones cool off they tend to absorb moisture and expand into the shield.

The nested cones with shields applied thereto as they appear in delivery chute 6 are represented in cross-section in Figure 2. As shown, each cone 30 is provided with a shield 20 which covers the middle portion of the cone, leaving the top marginal portion and the apex portion unshielded.

The type of adhesive medium chosen to obtain engagement between the cone and the shield may vary widely. As further examples may be mentioned dextrines, gelatinized starches, gums, gelatin and other gelatinous materials which have adhesive characteristics and are non-injurious to the consumer. It is preferable, in accordance with this invention, to employ an adhesive of such character and in such amount to form the seams or overlap portion of the shield and to hold the shield to the cone in such a way that the shield may be readily stripped apart at the adhesive seam and removed from the cone without tearing the paper.

Instead of fastening the shield directly to the cone by means of an adhesive medium, we may employ other means for bringing about the desired engagement between the shield and the cone. Among the ways in which this may be accomplished are the following:

1. Mechanical perforations in the body of the shield which will have a tendency to catch on the grooved surface of the cone.
2. A shoulder at the top of the shield that will grab the ring near the top of the cone.
3. Special forms of the cone itself, so that the shield can be more or less snapped into place.
4. The use of flexible paper in making the cone shield such as crepe paper.
5. Humidifying the paper, thereby stretching the paper so that as it dries it will shrink to the cone. Inasmuch as the shield is applied while the cone is still hot, this method provides for an engagement resulting from an expansion of the cone when it cools off and a contraction of the shield as it dries.
6. Wetting the outside of the cone or the inside of the shield tends to make sticky the wafer from which the cone is made.
7. Preparing the shield on the inside with a wax or some other material that will soften when it comes into contact with the hot cone and will cause the shield to adhere when the cone cools.
8. Using a paper for the shield that is very rough on one side and smooth on the other so that the rough side will adhere to the cone while the smooth side will not catch on the succeeding cone.

It will be recognized that for the purpose of the present invention the shield or holder for the cone must be fairly readily removable as the cone is eaten. At the same time it must be capable of staying on the cone when the cone is in stacked or nested relationship with other cones because it would be undesirable to have the cone shield drop into the next succeeding cone.

It will be understood that the form of the pastry cone may vary widely without departing from this invention. Likewise, the blanks from which the paper shields are made may be of many different configurations.

Having thus described the invention, what we claim as new and desire to secure by Letters Patent of the United States is:

1. In an apparatus for making pastry cones, the combination of, a stacking mechanism for stacking said cones in nested relationship and means associated with said stacking mechanism for applying a protective shield to each of said cones before it is nested by said stacking mechanism.

2. In an apparatus for making pastry cones, the combination of, a delivery means for delivering pastry cones, a stacking mechanism to stack them in nested relationship and means associated with said delivery means for engaging each of said cones with a surrounding protective shield before it is nested by said stacking mechanism.

3. In an apparatus for making pastry cones, the combination of, a delivery means for delivering said cones from a baking mold, a stacking mechanism to stack said cones in nested relationship and means associated with said delivery means for applying a protecting shield to said cones after the cones have left the baking molds and before they are stacked in nested relationship in the stacking mechanism.

4. In an apparatus for making pastry cones, the combination of, a delivery means for delivering pastry cones to a stacking mechanism to stack them in nested relationship, means associated with said delivery means for interposing a paper shield in the path of each of said cones before it is stacked and means for effecting engagement between said shield and said cone adapted to retain said shield in direct contact with the outer surface of said cone.

5. In a method of applying a protective cover to pastry cones the steps which comprise successively feeding pastry cones along a predetermined path, depositing a pre-formed protective cover in advance of each cone, passing the pointed end of the cone into the larger end of the cover, seating the cone therein, and nesting the covered cones in a stack of similar covered cones.

6. A method of applying a paper wrapper to the exterior of a pastry cone which consists in applying a humidified paper wrapper having shrinking tendencies in close engagement with the exterior of a fresh pastry cone having expansion tendencies, and then permitting said engaged wrapper and cone to effect their respective shrinking and expansion tendencies to further tighten said wrapper around said cone.

WALTER E. AMBERG.
ARTHUR S. BOWES.
STEPHEN W. AMBERG.